United States Patent
Nishida et al.

(10) Patent No.: US 7,639,676 B2
(45) Date of Patent: Dec. 29, 2009

(54) SIP SERVER

(75) Inventors: Minoru Nishida, Yokohama (JP); Kousei Kataoka, Yokohama (JP); Miwa Kususe, Yokohama (JP); Tadashi Takaba, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 10/946,629

(22) Filed: Sep. 21, 2004

(65) Prior Publication Data

US 2005/0207358 A1 Sep. 22, 2005

(30) Foreign Application Priority Data

Mar. 18, 2004 (JP) ............................. 2004-078428

(51) Int. Cl.
*H04Q 11/00* (2006.01)

(52) U.S. Cl. ...................................... 370/363; 370/353

(58) Field of Classification Search ................. 370/230, 370/235, 237, 352, 353, 363, 371, 374, 381
See application file for complete search history.

(56) References Cited

U.S. PATENT DOCUMENTS

| | | | | |
|---|---|---|---|---|
| 2002/0176557 A1* | 11/2002 | Burger | ................. | 379/207.02 |
| 2003/0058838 A1* | 3/2003 | Wengrovitz | ................. | 370/352 |
| 2003/0224781 A1* | 12/2003 | Milford et al. | ........... | 455/426.1 |
| 2004/0213209 A1* | 10/2004 | O'Connor et al. | ........... | 370/352 |
| 2005/0154793 A1* | 7/2005 | Khartabil | .................... | 709/227 |
| 2005/0169227 A1* | 8/2005 | Dowling | ..................... | 370/342 |

FOREIGN PATENT DOCUMENTS

| | | |
|---|---|---|
| JP | 04-165747 | 6/1992 |
| JP | 06-098361 | 4/1994 |
| JP | 06-169496 | 6/1994 |
| JP | 06-177983 | 6/1994 |
| JP | 07-058747 | 3/1995 |
| JP | 2000-201220 | 7/2000 |
| WO | WO 0033549 A2 * | 6/2000 |
| WO | WO 0211372 A1 * | 2/2002 |

OTHER PUBLICATIONS

Giordano, S. et al., "Managing Multimedia Traffic in IP Integrated over Differentiated Services: SIP Dynamic Signaling Inter-Working," Proceedings of the 36th Annual Hawaii International Conference on System Sciences, 2003, Jan. 6-9, 2003. pp. 8.*

* cited by examiner

*Primary Examiner*—Donald L Mills
(74) *Attorney, Agent, or Firm*—Katten Muchin Rosenman LLP

(57) ABSTRACT

The number of simultaneous connections to a SIP server is increased without degrading overall performance. If it is judged that, when a newly requested call is accepted, the number of calls whose call control data is stored in a call processing memory or the amount of the call control data stored in the call processing memory would exceed an upper limit, the call control data stored in the call processing memory for a busy call is saved in an external storage device. As the frequency of occurrence of an event is low in the case of a busy call, it becomes possible to accept the new call without degrading overall performance.

9 Claims, 16 Drawing Sheets

Fig.10

SUBSCRIBER BANDWIDTH MANAGEMENT TABLE

| : |
|---|
| BANDWIDTH CURRENTLY USED |
| : |

↓ DN/URI

Fig.11

SUBSCRIBER DATA 40

| : |
|---|
| SUBSCRIBER INFORMATION<br>CONTRACT CONDITIONS<br>CONTRACTED MAXIMUM BANDWIDTH |
| : |

↓ DN/URI

Fig.12

SAVE CONDITION TABLE

| CODECS FOR WHICH CONDITION IS TO BE STORED<br>CALL DURATION TIME AS CRITERION FOR SAVING<br>SAVE PRIORITY |
|---|

Fig.13

AVERAGE CALL DURATION TIME STORING TABLE ↓ CODEC FOR WHICH CONDITION IS TO BE STORED

| ⋮ |
|---|
| AVERAGE CALL DURATION TIME ACCUMULATED NUMBER OF CALLS ⋮ |

Fig. 16

| CALL DESTINATION INFORMATION TABLE | |
|---|---|
| ... | ... |
| DESTINATION INFORMATION<br>AVERAGE CALL DURATION TIME<br>ACCUMULATED NUMBER OF CALLS | INFORMATION STORED FOR DESTINATIONS UP TO THE NUMBER SPECIFIED BY SAVE PRIORITY |
| ... | |

Fig.18

AUTOMATIC SAVE/RESTORE CONDITION TABLE

```
AMOUNT OF MM USAGE
PERCENTAGE OF MM USAGE
CC CONGESTION CONDITION
NUMBER OF OCCURRENCES OF NEW CALLS PER UNIT TIME
```

SIP SERVER

BACKGROUND OF THE INVENTION

1. Field of the Invention

The present invention relates to a SIP (Session Initiation Protocol) server which is installed in an IP (Internet Protocol) network, and which functions to relay transfer of call control signals between terminals subscribing to IP telephone services and thereby connect a call between the terminals and, more particularly, to a SIP server of the type equipped with a call processing memory for storing the state of each activated call.

2. Description of the Related Art

A SIP server relays transfer of call control signals between IP telephone terminals and thus helps to establish a session between the terminals. When connecting a call between terminals served by different SIP servers (i.e., terminals belonging to different SIP servers), messages are relayed between the SIP servers to which the respective terminals belong.

The SIP server in the present invention further includes a call processing memory for storing call states such as ringing, busy, etc. for each activated call from the initiation to the disconnection of the call for such purposes as billing, and messages relating to session initiation and session disconnection between the terminals are also transferred via the SIP server.

In this case, when the session connection requests arising from subscribers of the service provided by the SIP server concentrate in the same time period, resulting in the occurrence of session connection requests exceeding the capacity of the call control memory area allocated in the SIP server by the system, there arises the problem that the session connections from the subscribers are limited by the SIP server.

In one method for resolving such session connection blocking in the SIP server, the call control memory area is allocated in the SIP server by defining the memory area at the maximum possible size within the address space accessible by the OS, and a threshold value is set in advance; then, when the number of sessions (calls) has increased, if resources necessary for call connections are sufficiently available, the threshold value is controlled so as to increase the number of subscriber sessions that can be connected simultaneously to the SIP server.

However, this method of solution has the problem that it cannot cope with the situation when the number of simultaneous connections has increased beyond the capacity of the call control memory area.

In Japanese Unexamined Publication No. H06-169496 (Call Acceptance Control Method in ATM Switch), there is described a method in which a management table sufficient for the number of simultaneous call connections is provided and a decision is made whether to accept or not accept a new call. However, even if a sufficient management table is provided, there still remains the problem that, when session connection requests exceeding the capacity of the management table have arisen simultaneously from subscribers, the session connection requests from the subscribers have to be limited.

In Japanese Unexamined Publication No. H04-165747 (Call Acceptance Determining Method), a method is described that uses a management table which secures a maximum amount of communication resources defined for each class of communication quality. However, even if a management table securing a maximum amount of communication resources is provided, there still remains the problem that, when session connection requests exceeding the capacity of the management table have arisen simultaneously from the subscribers, the session connection requests from the subscribers have to be limited.

Further, a control method based on the standpoint of optimizing memory resources for call processing is described in Japanese Unexamined Publication No. H06-98361 (Call Processing Data Area Management System), but in this invention also, as data areas for call connection processing are reallocated to secure a continuous call processing data area, it is not possible to expand the data area itself or increase the maximum number of call connections.

As described above, when session connection requests have occurred exceeding the capacity of the call control memory area allocated in the SIP server by the system, or when session connection requests have occurred exceeding the memory space accessible by the system, the prior art has not been able to accept a new call to the SIP server, and has therefore had to limit the acceptance of session requests for new calls.

SUMMARY OF THE INVENTION

An object of the present invention is to increase the number of simultaneous connections by making provisions in a SIP server so as to be able to accept a new call even when session connection requests have occurred exceeding the capacity of the call control memory area, or when session connection requests have occurred exceeding the memory space accessible to the system.

A SIP server according to the present invention comprises: a call processing memory for storing call control data indicating a call state for each activated call; saving means for selecting one of busy calls whose call control data is stored in the call processing memory, and saving the call control data for the selected busy call from the call processing memory to an external storage device; and restoring means for restoring the saved call control data to the call processing memory when a call disconnect event is received for the call whose call control data is saved in the external storage device.

The SIP server is required to have quick response for connected calls which demand stringent real time processing, but in the case of busy calls, the real time requirement is not so stringent as they include "always on" calls. In view of this, provisions are made to save the call processing data for a busy call in an external storage device, thus making it possible to accept a new call without degrading overall performance.

BRIEF DESCRIPTION OF THE DRAWINGS

FIG. 10 is a diagram showing the structure of a subscriber bandwidth management table;

FIG. 11 is a diagram showing the structure of subscriber data 40;

FIG. 12 is a diagram showing the structure of a save condition table;

FIG. 13 is a diagram showing the structure of an average call duration time storing table;

FIG. 16 is a diagram showing the structure of a call destination information table;

FIG. 18 is a diagram showing the structure of an automatic save/restore condition table.

DESCRIPTION OF THE PREFERRED EMBODIMENTS

Figure 1:
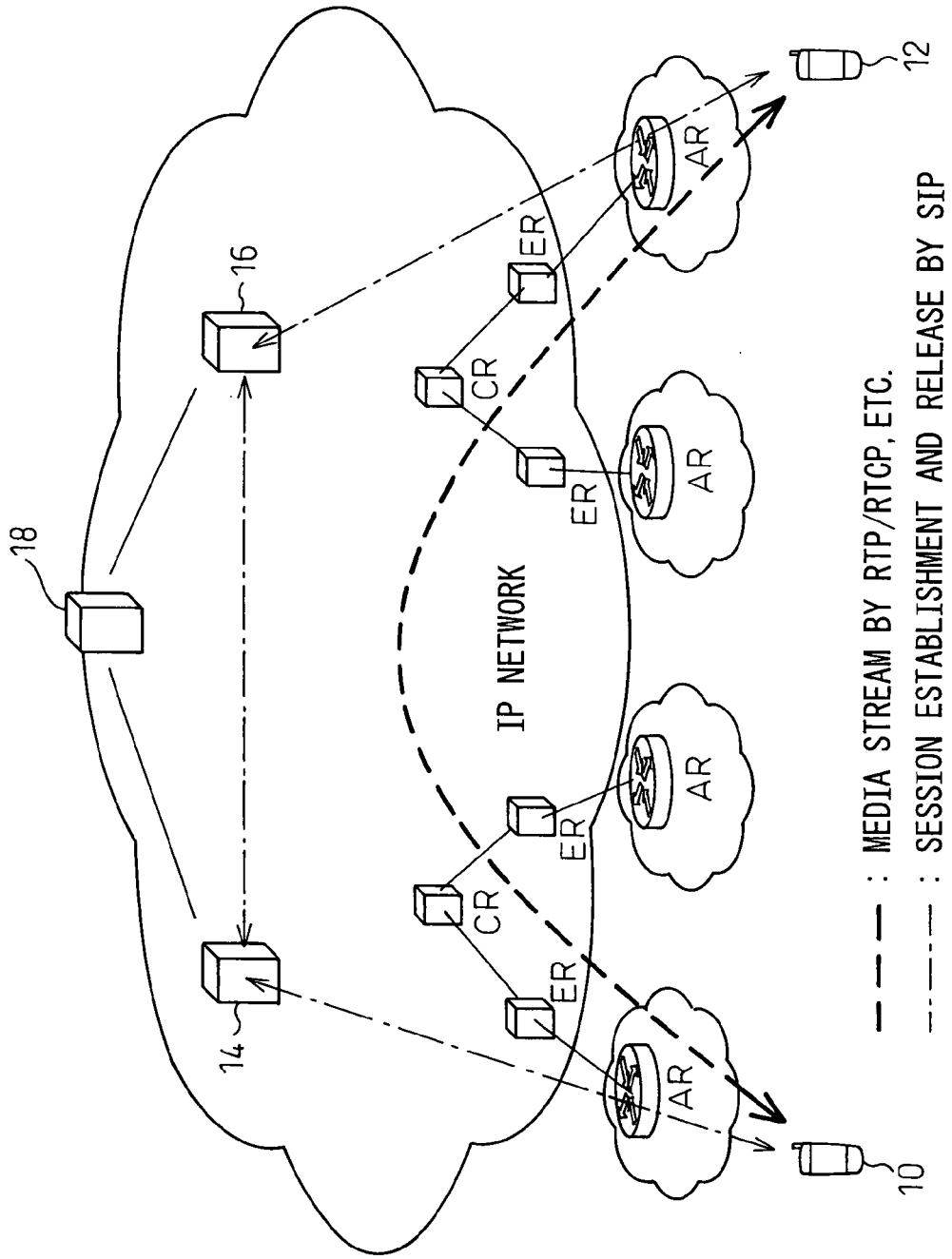
FIG. 1 is a diagram showing one configuration example of an IP network containing SIP servers according to one embodiment of the present invention.
Figure 2:
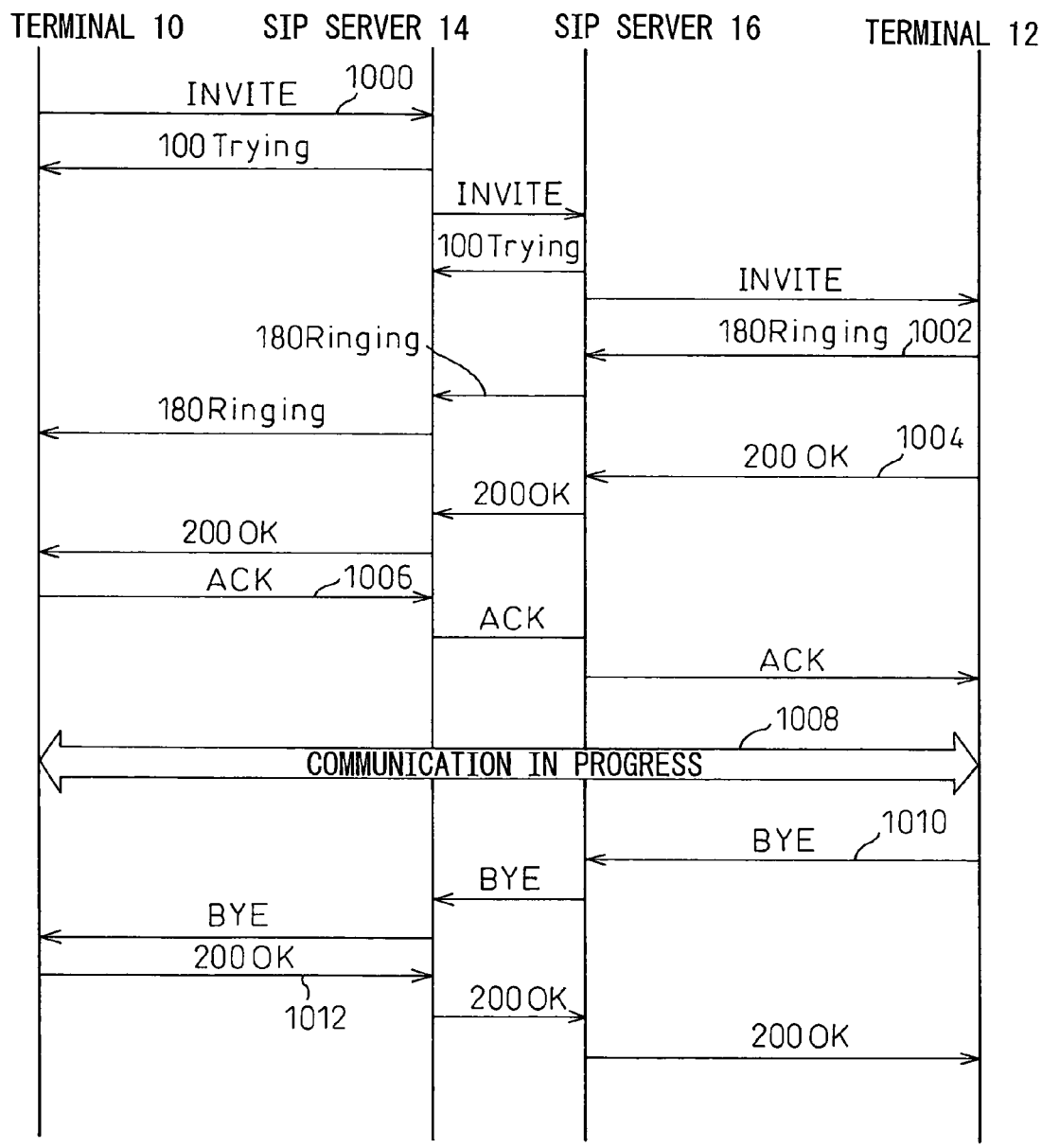
FIG. 2 is a signal sequence diagram of call control messages.

FIG. 1 shows one configuration example of an IP network containing SIP servers according to one embodiment of the present invention, and FIG. 2 shows one example of a signal sequence between terminals to which IP telephone services are provided from the SIP servers.

In FIG. 1, when a call is initiated by a terminal 10 for connection to a terminal 12, an "INVITE" message is sent from the terminal 10 to the SIP server 14 serving it along the route indicated by a semi-dashed line in FIG. 1 (FIG. 2: Step 1000). The SIP server 14 identifies the SIP server 16 serving the destination terminal 12 from SIP URI (Universal Resource Identifier) contained in the message, and transfers the message to the SIP server 16, which forwards the message to the terminal 12 to notify the terminal 12 of the arrival of a call from the terminal 10. The terminal 12 sends a "180 Ringing" message to the terminal 10 via the SIP servers 16 and 14, to notify the terminal 10 that the terminal 12 is being rung thus alerting the called party to the incoming call (step 1002). When the called party responds by taking the terminal 12 off-hook, a "200 OK" message is sent along the same route (step 1004). When the terminal 10 sends back an "ACK" message to the terminal 12 (step 1006), the session between the terminals is established, and communication conforming to RTP/RTCP (Real-time Transport Protocol/RTP Control Protocol) is initiated directly between the terminals 10 and 12 along the route indicated by a thick dashed line in FIG. 1 (step 1008). When a disconnect operation is performed at either terminal, a "BYE" message is sent to the other terminal (step 1010), and a "200 OK" message responding to it is sent back (step 1012), upon which the session between the terminals is terminated.

As shown in FIG. 2, as the SIP servers according to the present invention direct the respective terminals to send all the call control messages including the ACK message and the subsequent messages (the BYE message, etc.) via the SIP servers, each SIP server can keep track of the call state of every activated call, and the call state is recorded in a call processing memory.

Between the terminals 10 and 12, not only voice data but video data, etc. may also be transmitted within the contracted bandwidth. In FIG. 1, AR designates an area router, ER an edge router, and CR a core router. Reference numeral 18 indicates a network operating system for supervising the network.

Figure 3:
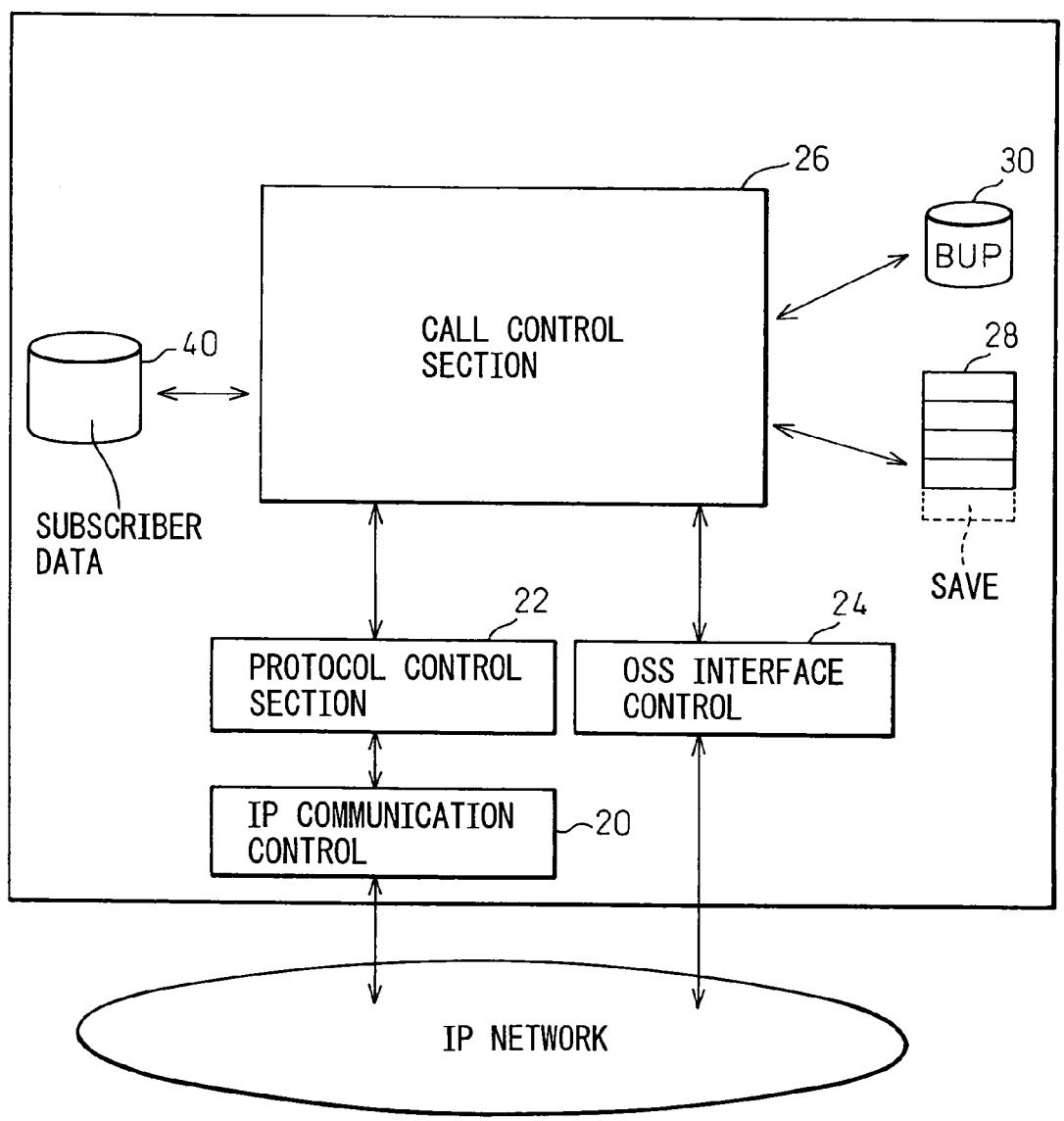
FIG. 3 is a block diagram showing the configuration of a SIP server according to one embodiment of the present invention.

FIG. 3 shows the configuration of one embodiment of the SIP servers 14, 16 according to the present invention. An IP communication control section 20 as the lowest layer performs processing to control signal transmission and reception during communications being performed via the IP network. A protocol control section 22 performs SIP protocol control. An OSS interface control section 24 serves as an interface to the network operating system 18 (FIG. 1).

Figure 4:
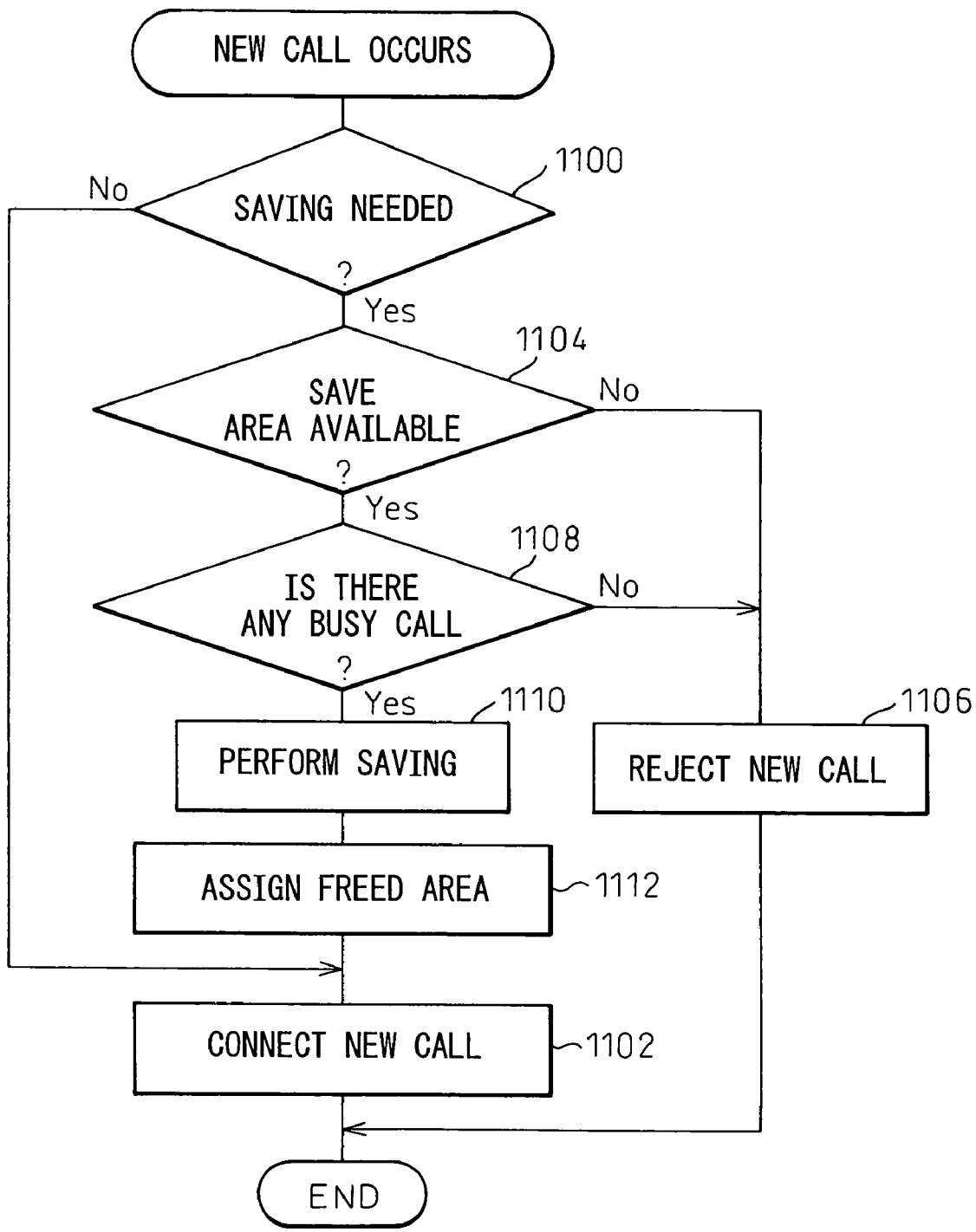
FIG. 4 is a flowchart showing a first example of the processing for saving performed in a call control section 26.

When any of the above-described messages is received, the protocol control section 22 delivers a notification of reception in the form of an event to a call control section 26, which then performs necessary processing such as identifying the destination of the message, transferring the message, and updating the call processing memory 28, and if needed, also performs processing to retrieve call control data from the call processing memory 28 allocated in a physical memory and save it in an external storage device 30, as illustrated in FIG. 4.

In FIG. 4, when an event occurs notifying that the INVITE message is received from a terminal, a decision is made as to whether there is a need to save the call control data in order to accept the new call (step 1100). More specifically, if it is judged that, when the new call is accepted, the number of connections (calls) recorded in the call processing memory 28 would exceed the predetermined upper limit value or the memory space that can be allocated to the call processing memory 28, then it is decided that there is a need to save the call control data.

Figure 5:
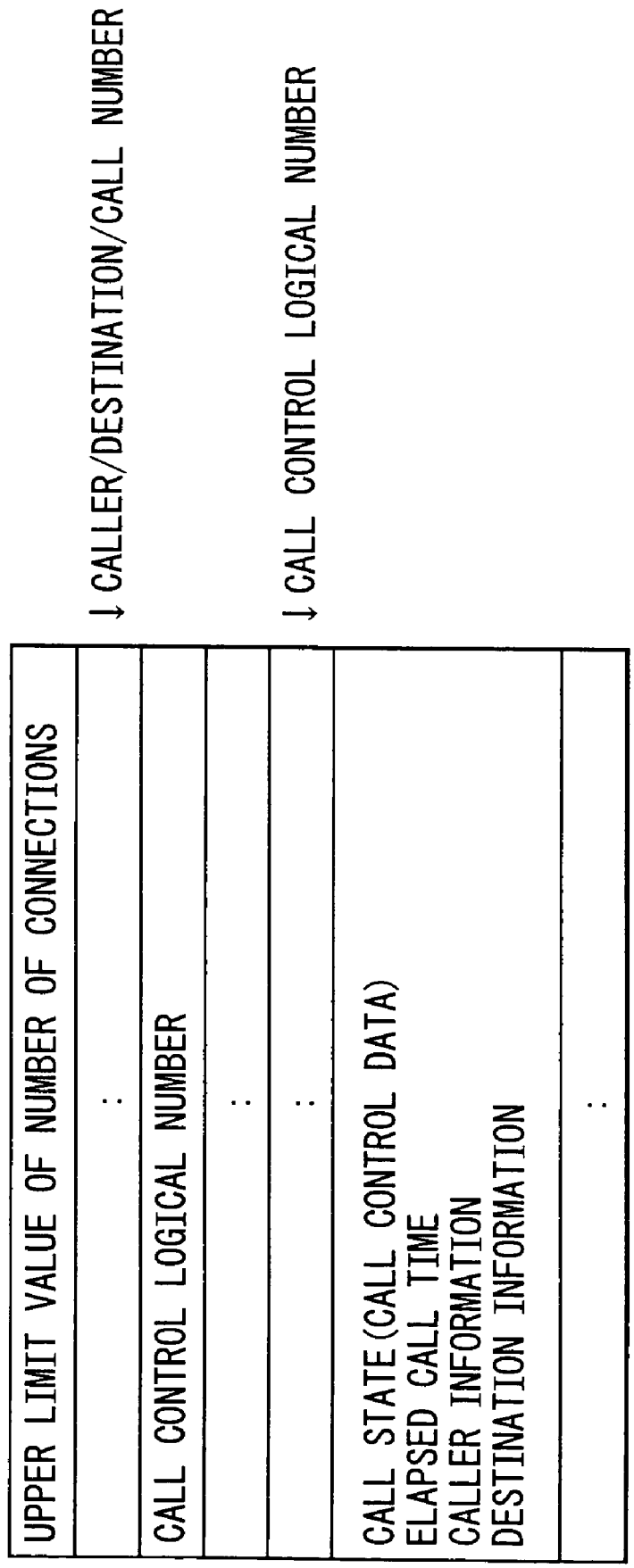
FIG. 5 is a diagram showing the structure of a call processing memory 28.

FIG. 5 shows one example of the structure of the call processing memory 28. The upper limit value defining the maximum number of connections that can be recorded in the call processing memory 28 is stored at the head of the memory, followed by call control logical numbers recorded at locations addressed by caller/destination/call number, further followed by the call control data relating to each activated call, such as call state (ringing, busy, etc.), elapsed call time, caller information, and call destination information, recorded at locations addressed by the call control logical numbers.

Turning back to FIG. 4, if it is decided in step 1100 that there is no need to save the call control data, the usual processing for new call connection is performed, which includes identifying the destination of the message, transferring the message, and updating the call control data stored in the call processing memory 28 (step 1102). On the other hand, if it is decided in step 1100 that there is a need to save the call control data, the save area (FIG. 3: 30) in the external storage device is checked to see if free space is available therein to save the call control data (step 1104). If the call control data cannot be saved because there is no free space in the save area 30, the new call is rejected to deny the acceptance (step 1106).

Figure 6:
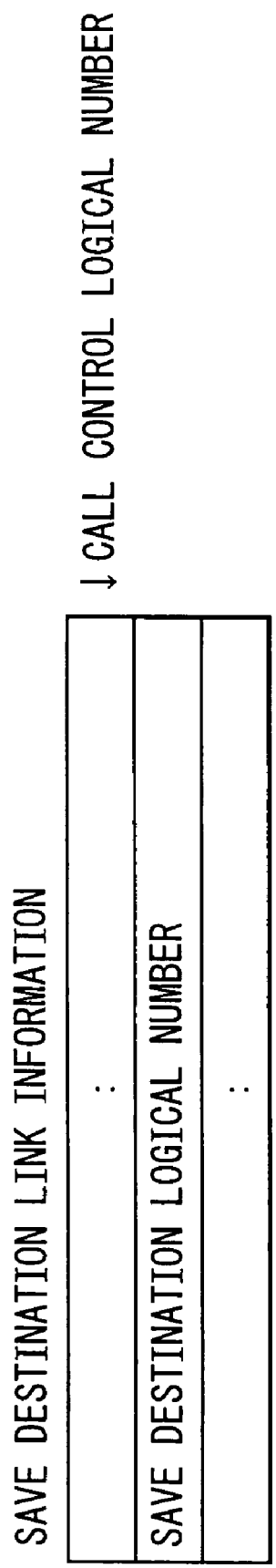
FIG. 6 is a diagram showing the structure of save destination link information.
Figure 7:
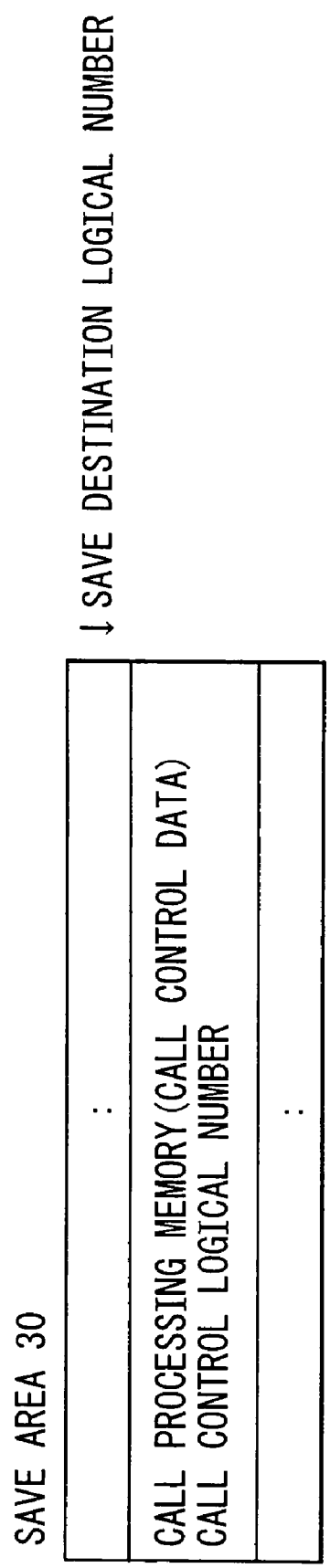
FIG. 7 is a diagram showing the structure of a save area 30.

If there is free space in the save area 30 so that the call control data can be saved, the call state of each call stored in the call processing memory 28 is checked to see if there is a call whose state is "busy" (step 1108). If there is no busy call, or if any such call has been saved and does not remain in the call processing memory 28, the new call is rejected to deny the acceptance (step 1106). If there is a busy call, the call control data relating to that call is saved in the save area 30 (step 1110). The freed area in the call processing memory is assigned to the new call (step 1112), thus making it possible to accept the new call (step 1102). At this time, the save destination logical number of the saved call is recorded as save destination link information at the location addressed by the call control logical number, as shown in FIG. 6, and the saved contents (call control data) of the call processing memory and the call control logical number are stored in the save area 30 at the location addressed by the save destination logical number. Accordingly, mutual reference can be made between the call processing memory 28 and the save area 30.

Figure 8:
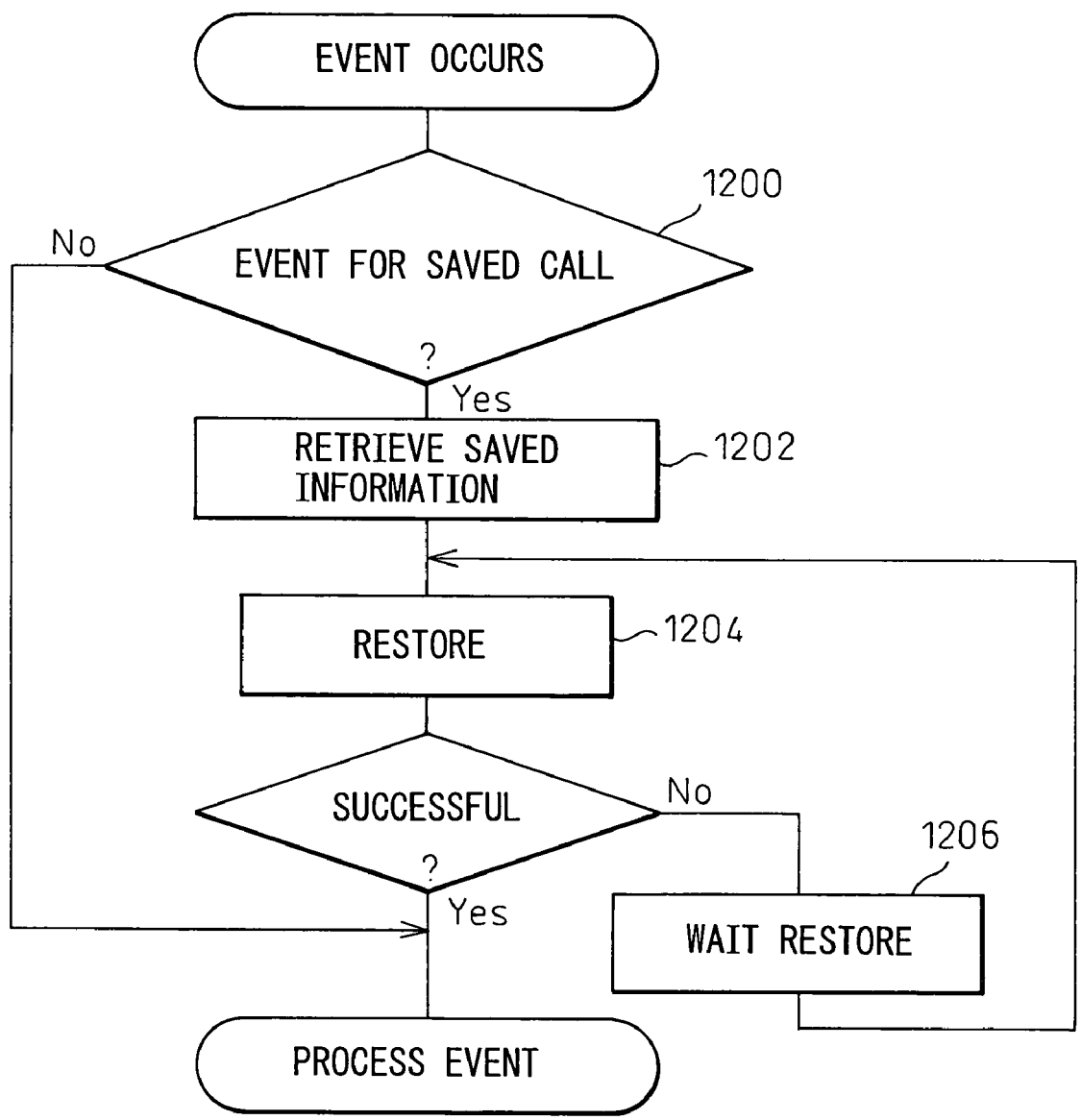
FIG. 8 is a flowchart showing the processing for restoration performed in the call control section 26.

FIG. 8 is a flowchart illustrating the processing performed in the call control section 26 when another event has occurred after the new call initiation (INVITE) event. Upon occurrence of an event, first the call for which the event has occurred is checked to see whether its call control data is stored in the call processing memory 28, that is, whether its call control data is saved in the save area 30 (step 1200). If no such data is saved, processing appropriate to the event that has occurred is performed immediately. On the other hand, if the corresponding call control data is saved then, using the call control logical number recorded in the call processing memory 28, the save destination link information of FIG. 6 is searched to retrieve the save destination logical number, using which the call control data is retrieved from the save area 30 (sep 1202).

In the restoring step (step 1204), similarly to step 1100 in FIG. 4, if it is judged that, when the call control data retrieved from the save area 30 is restored to the call processing memory 28, the number of connections (calls) recorded in the call processing memory 28 would exceed the upper limit value or the memory space that can be allocated to the call processing memory 28, the restoration is rendered unsuccessful and, after waiting a predetermined time (step 1206), a retry is made. If the upper limit is not exceeded, the call control data retrieved from the save area 30 is restored to the call processing memory 28, after which the processing appropriate to the event is performed.

The restoring step is performed when a disconnection request (BYE message) is received from either terminal during the call, but the same processing is also performed when the saved call is disconnected for some reason attributable to the system.

Figure 9:
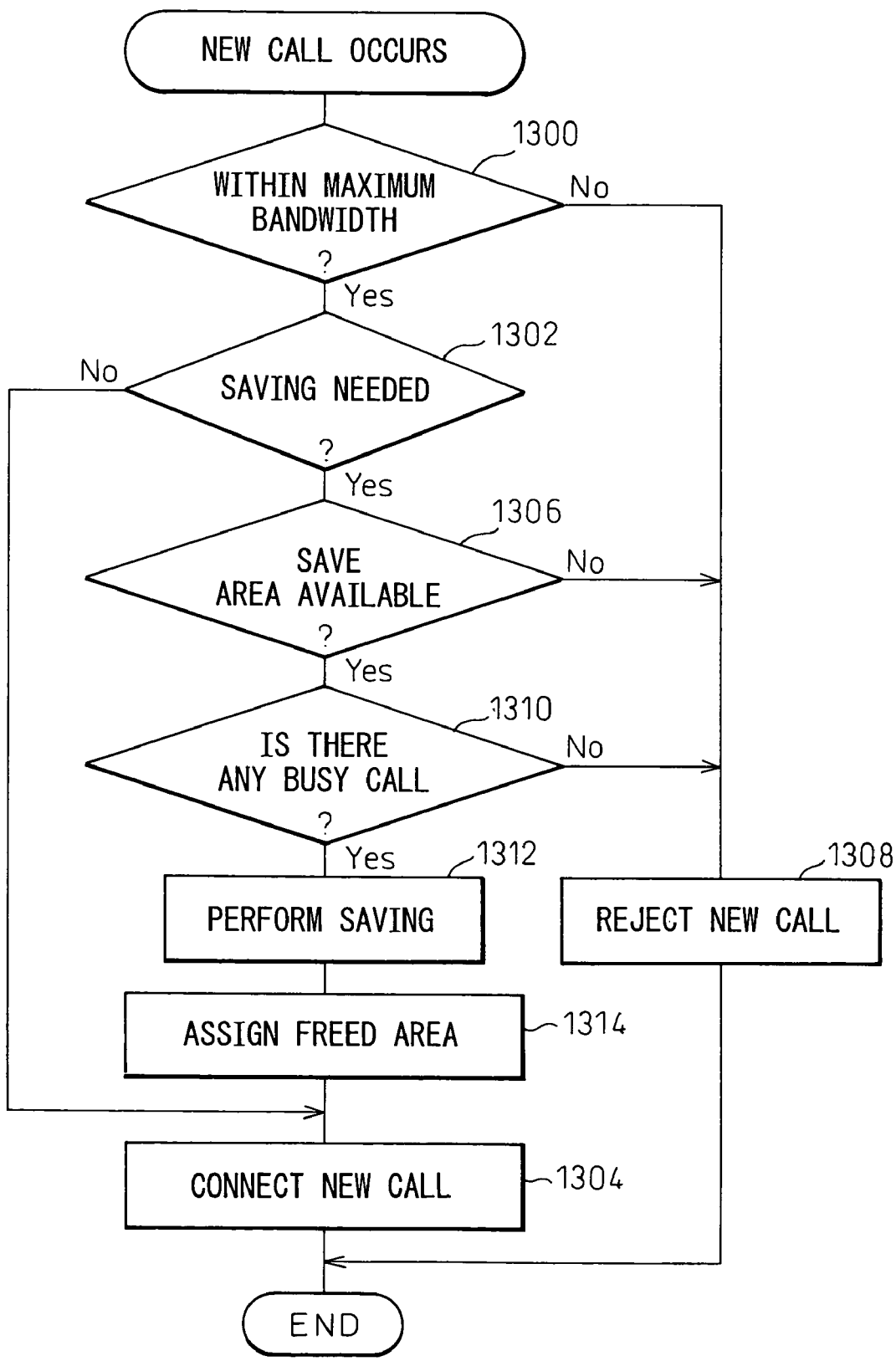
FIG. 9 is a flowchart showing a second example of the processing for saving performed in the call control section 26.

FIG. 9 shows one modified example of the processing performed in the call control section 26 shown in FIG. 4. FIG. 10 shows the contents of a subscriber bandwidth management table which records the total value of the currently used bandwidth for each subscriber, and FIG. 11 shows the structure of subscriber data 40 (FIG. 3). When a call initiation related event (reception of an INVITE message) occurs from a terminal, first an access is made to the subscriber bandwidth management table (FIG. 10) to check the bandwidth currently used by the subscriber. If the sum of the currently used bandwidth and the bandwidth requested by the new call exceeds the contracted maximum bandwidth stored in the subscriber data 40 (FIG. 11), the new call cannot be accepted even if data in the call processing memory is saved, and saving the data would be useless; therefore, in such cases, the call acceptance is denied (step 1300). If the sum does not exceed the contracted maximum bandwidth, the process from step 1302 to step 1314 is performed, which is the same as the process from step 1100 to step 1112 in FIG. 4, and therefore, a description will not be given here.

In step 1110 in FIG. 4, or in step 1312 in FIG. 9, if there are a plurality of busy calls, it is desirable that the call whose call control data is to be saved be selected based on the elapsed call time recorded in the call processing memory 28 (FIGS. 3 and 5). More specifically, the call whose elapsed call time is the longest, for example, is selected as the call to be saved, or alternatively, any call whose elapsed call time exceeds a predetermined threshold is saved. It is speculated that, for such calls, the frequency of occurrence of an event such as disconnection is low, and it is therefore believed that saving their call control data would have little effect on the overall performance.

Alternatively, provisions may be made to refer to the contract conditions stored in the subscriber data 40 (FIGS. 3 and 11) and to preferentially save calls originated from subscribers of "always on" access service or calls designated, under the contract, as calls that can tolerate a delay at the time of disconnection.

Certain kinds of servers, such as content servers that provide delivery service, have the characteristic that a call, once connected, tends to remain connected for a long time. Therefore, call destinations having such a characteristic may be detected in advance and, for any call whose destination corresponds to any of such destinations, the call control data may be saved when the call enters the busy state after the session has been established; in this case also, little effect will be caused to the overall performance.

Figure 14:
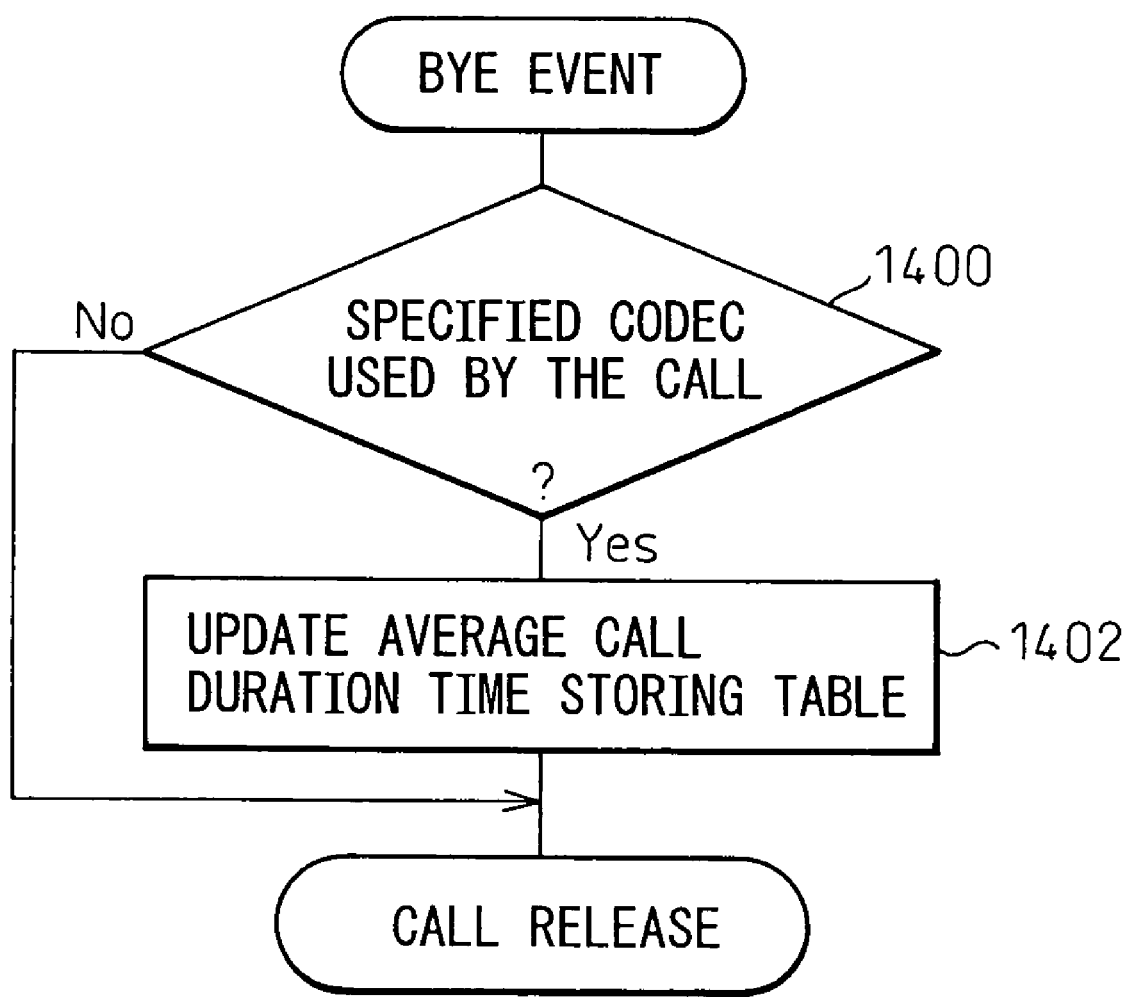
FIG. 14 is a flowchart illustrating the processing for average call duration time calculation performed in the call control section 26.

In a first example of a method for detecting a call destination to which the call tends to remain connected for a long time, the specification of codecs for which a save condition is to be stored and the value of call duration time as a criterion for saving are stored in a save condition table as shown in FIG. 12, for example, by a command from the network operating system 18. There are several tens of kinds of codecs used for transmission of voice and moving images; of these codecs, codecs that may be used in servers to which calls tend to remain connected for a long time are specified in advance. Further, an average call duration time storing table for storing the average call duration time and the accumulated number of calls for each specified codec, as shown in FIG. 13, is provided in order to calculate for each codec the average call duration time of calls that have used the specified codec. Then, as shown in the flowchart of FIG. 14, when any of the codecs specified in the save condition table (FIG. 12) has been used by a call (step 1400), the contents of the average call duration time storing table are updated by the call duration time of the call at the time of the occurrence of a BYE event indicating release of the call (step 1402). In this updating step, the accumulated number of calls is incremented by 1, and the average call duration time is updated by multiplying the average call duration time by the number of calls before updating, adding the resulting product to the newly obtained call duration time, and dividing the sum by the updated number of calls. Any call that uses the codec for which the average call duration time thus obtained exceeds the saving-criterion call duration time recorded in the save condition table is judged to be a call to a destination to which the call tends to remain connected for a long time.

Figure 15:
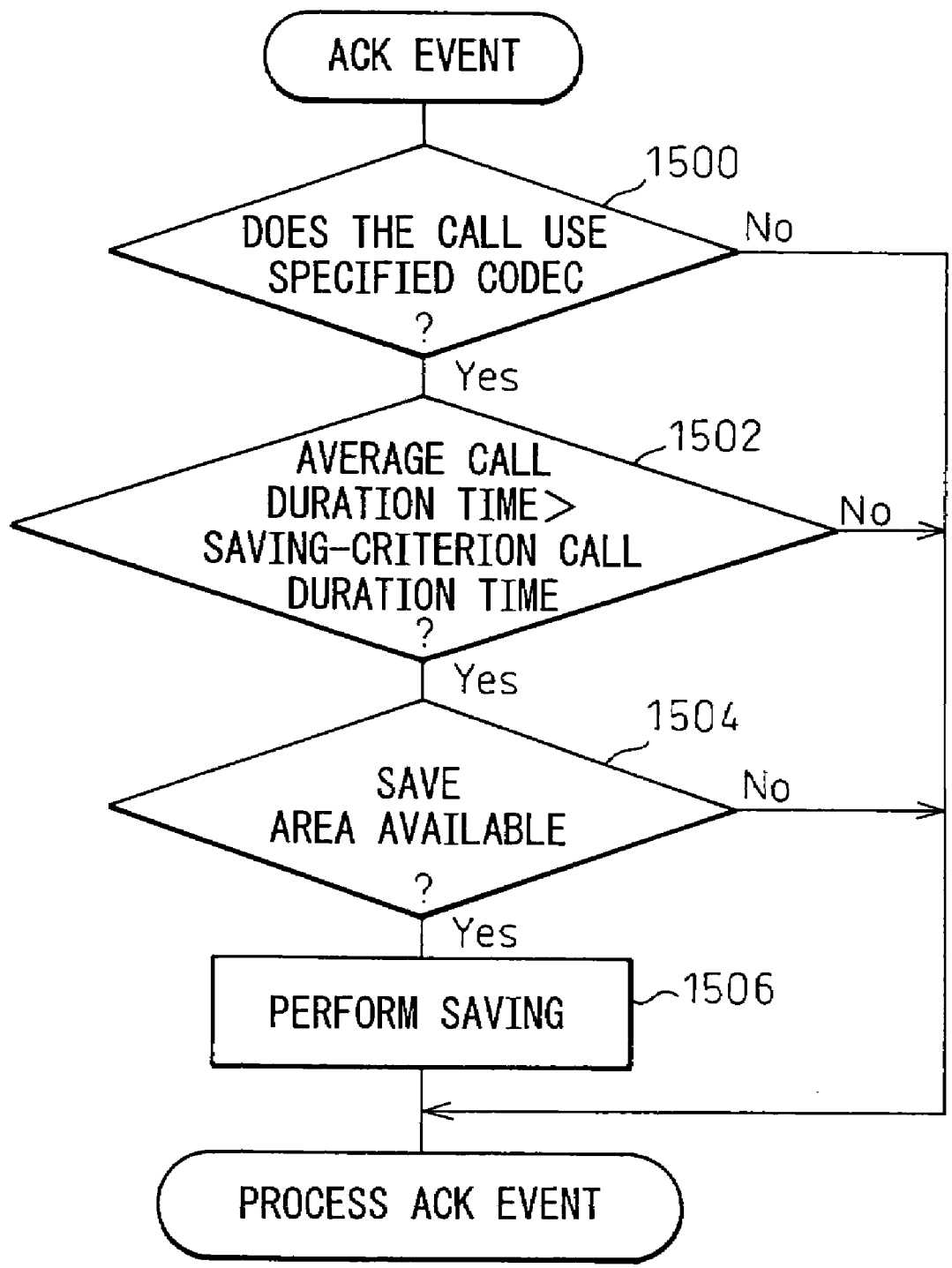
FIG. 15 is a flowchart showing a third example of the processing for saving performed in the call control section 26.

As shown in the flowchart of FIG. 15, if, at the time of the occurrence of an ACK event indicting a transition to the busy state, it is judged that the codec that the call is using is one of the specified codecs (step 1500), the average call duration time of the codec recorded in the average call duration time storing table (FIG. 13) is compared with the saving-criterion call duration time stored in the save condition table (FIG. 12) (step 1502), and if the average call duration time exceeds the saving-criterion call duration time, saving of the call control data is initiated (step 1506). If there is no space available in the save area, saving of the call control data is not performed (step 1504). In this way, if the call destination is one to which the call tends to remain connected for a long time, the call control data can be saved at the time that the call makes a transition to the connected state.

Figure 17:
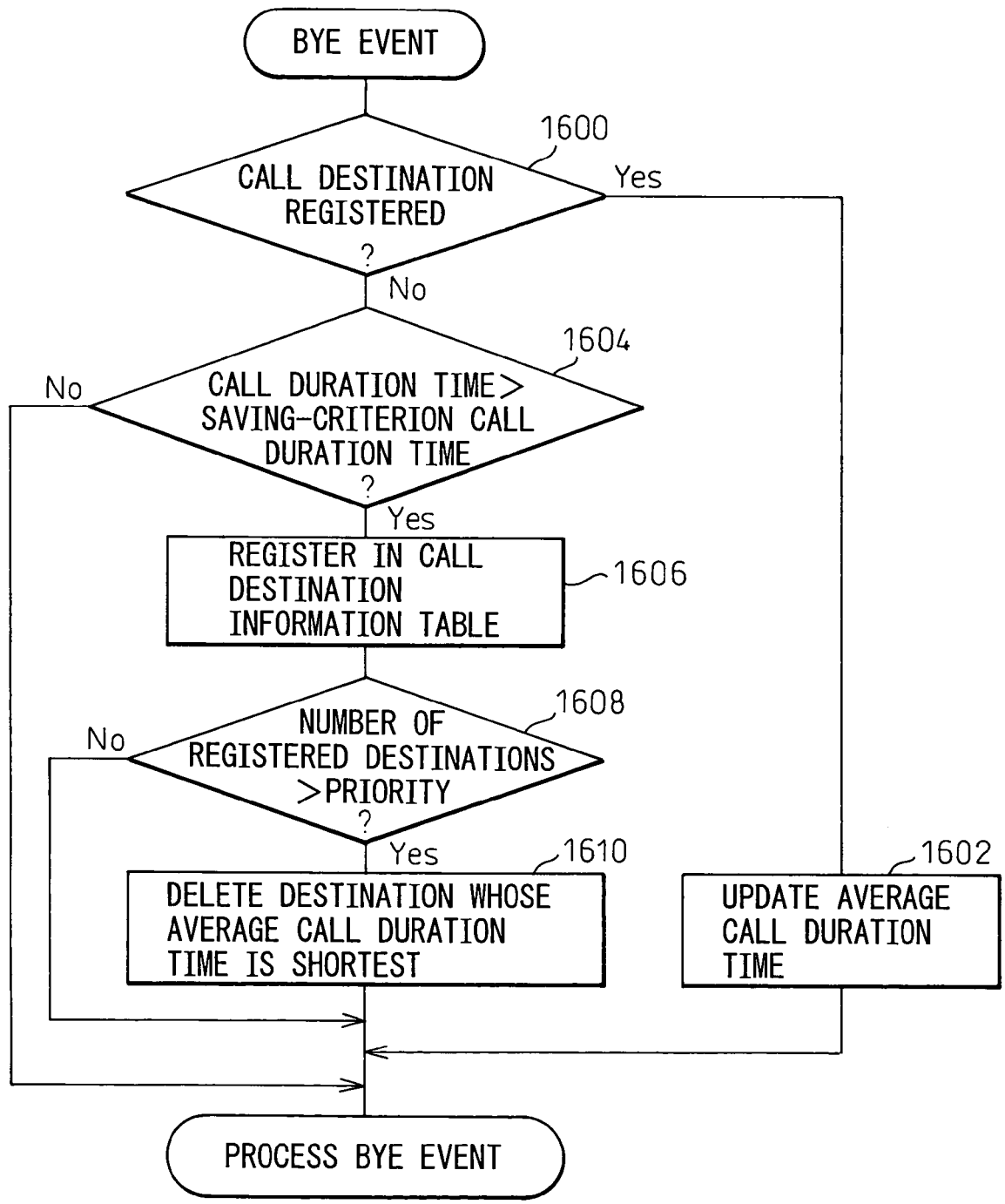
FIG. 17 is a flowchart illustrating the processing performed for updating the call destination information table in the call control section 26.

In a second example of the method for detecting a call destination to which the call tends to remain connected for a long time, the average call duration time is calculated for each call destination, and if the calculated average call duration time exceeds the saving-criterion call duration time, the call destination can be judged as being one to which the call tends to remain connected for a long time. More specifically, a save priority, that is, the number of call destinations for which the average call duration time is calculated, is stored along with the saving-criterion call duration time in the save condition table of FIG. 12. Then, using the call destination information table of FIG. 16, the average call duration time is calculated for each of the destinations to which calls remained connected for a long time. As shown in the flowchart of FIG. 17, at the time of the occurrence of a BYE event indicating the initiation of call release, first it is determined whether the destination of the call being cleared is registered in the destination information table (FIG. 16) (step 1600), and if it is registered, the average call duration time and the accumulated number of calls for that destination are updated in the same manner as described in step 1402 in FIG. 14, by using the call duration time of the call being cleared (step 1602). If the destination is not registered then, if the call duration time exceeds the saving-criterion call duration time (step 1604), the destination is newly registered in the destination information table (FIG. 16) (step 1606); at this time, if the number of registered destinations exceeds the value of the save priority stored in the save condition table of FIG. 12, the destination whose average call duration time is the shortest is deleted (steps 1608 and 1610).

At the time of the occurrence of an ACK event indicting a transition to the busy state, the processing shown in the flowchart of FIG. 15 is performed, with the difference that, in step 1500, it is determined whether the destination of the call is registered in the destination information table of FIG. 16, instead of determining whether the codec is one of the specified codecs. In this way, if the call destination is one to which the call tends to remain connected for a long time, the call control data can be saved at the time that the call makes a transition to the busy state.

In the above-described examples, the call control data is saved by making a decision during transition to the busy state as to whether the call destination is one to which the call tends to remain connected for a long time, but alternatively, for each call whose call control data is stored in the call processing memory 28, the call control data may be saved in accordance with a command from the network operating system 18 by making a decision as to whether the call destination is a terminal to which the call tends to remain connected for a long time. In this case, the maximum number of calls to be saved may be specified from the network operating system, and the decision may be made until the number of saved calls reaches the specified number. Further, instead of specifying the number of calls to be saved, the number of calls to be saved may be specified in terms of the ratio to the number of calls stored in the call processing memory.

Alternatively, instead of saving the call control data for the call whose destination is one to which the call tends to remain connected for a long time, provisions may be made to specify the call duration time from the network operating system 18 and to save the call control data for any call whose call duration time has exceeded the specified call duration time.

Besides using the occurrence of a new call connection request, the transition to the busy state, or the reception of a command from the outside as the trigger to initiate the saving process, the system state may be monitored periodically and the saving process may be initiated automatically when a predetermined automatic save condition is satisfied. The system state stored in the automatic save/restore condition table of FIG. 18 and, for example, the amount of MM usage (the amount of call processing memory usage), the percentage of MM usage (the percentage of call processing memory usage), CC (call control) congestion condition, or the number of occurrences of new calls per unit time, can be used as the predetermined automatic save condition. In the saving process, a call in the busy state, a call selected based on the call duration time, or a call selected based on the contract conditions, such as described above, is saved, provided that there is free space available in the save area.

The automatic save/restore condition table stores not only the automatic save condition but also the automatic restore condition; when the latter condition is satisfied, the saved call control data is automatically restored.

The invention claimed is:

1. A SIP (Session Initiation Protocol) server for connecting a call between terminals by relaying transfer of call control signals between the terminals, comprising:
   a call processing memory for storing call control data indicating a call state for each activated call, said call control data including a call duration time of each activated call;
   an external storage device including a save area for storing the call control data, said external storage device being configured to perform a mutual reference with the call processing memory;
   saving means for selecting one of busy calls whose call control data is stored in the call processing memory, and saving the call control data for the selected busy call from the call processing memory to the external storage device; and
   restoring means for restoring the saved call control data to the call processing memory when a call disconnect event is received for the call whose call control data is saved in the external storage device;
   wherein said saving means is configured to:
      (I) decide as to whether there is a need to save the call control data is order to accept a new call,
      (II) check if free space is available in the external storage device,
      (III) check if there is a call whose state is busy in the call processing memory, and
      (IV) save the call control data relating to the busy call in said save area.

2. A SIP server according to claim 1, wherein the saving means performs the call control data saving in cases where the number of calls whose call control data is stored in the call processing memory or the amount of the call control data stored in the call processing memory would exceed a predetermined value when a newly requested call is accepted.

3. A SIP server according to claim 2, wherein, whatever the number of calls or the amount of the call control data, the saving means does not perform the call control data saving in cases where, when the newly requested call is accepted, bandwidth to be allocated for use by a subscriber requesting the call would exceed contracted maximum bandwidth.

4. A SIP server according to claim 1, wherein the saving means selects the busy call whose call control data is to be saved, based on the call duration time of the call.

5. A SIP server according to claim 1, wherein the saving means selects the busy call whose call control data is to be saved, based on service-providing contract conditions under which service is being provided to an originating terminal and a destination terminal of the call.

6. A SIP server according to claim 1, further comprising means for detecting a call whose destination is a terminal to which the call tends to remain connected for a long time, wherein
   the saving means saves the call control data for the detected call.

7. A SIP server according to claim 6 wherein, when a call making a transition to a connected state corresponds to the call whose destination is a terminal to which the call tends to remain connected for a long time, the saving means saves the call control data for the call.

8. A SIP server according to claim 6, wherein the saving means, in response to an external command, saves the call control data for the call whose destination is a terminal to which the call tends to remain connected for a long time.

9. A SIP server according to claim 1, wherein the saving means initiates the call control data saving when a system state satisfies a predetermined condition.

* * * * *